United States Patent
Zampini et al.

(10) Patent No.: US 10,259,747 B2
(45) Date of Patent: *Apr. 16, 2019

(54) ADVANCED FIBER REINFORCED CONCRETE MIX DESIGNS AND ADMIXTURES SYSTEMS

(71) Applicant: CEMEX RESEARCH GROUP AG, Brug Bei Biel (CH)

(72) Inventors: Davide Zampini, Lyss (CH); Alexandre Guerini, Cressier (CH); Giovanni Volpatti, Aegerten (CH); Jeremy Esser, Biel/Bienne (CH)

(73) Assignee: CEMEX RESEARCH GROUP AG, Brug Bei Biel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/573,389

(22) PCT Filed: Jun. 10, 2016

(86) PCT No.: PCT/EP2016/063312
§ 371 (c)(1),
(2) Date: Nov. 10, 2017

(87) PCT Pub. No.: WO2016/198608
PCT Pub. Date: Dec. 15, 2016

(65) Prior Publication Data
US 2018/0111876 A1    Apr. 26, 2018

(30) Foreign Application Priority Data

Jun. 11, 2015  (WO) ................ PCT/EP2015/063045

(51) Int. Cl.
| | | |
|---|---|---|
| C04B 14/04 | (2006.01) | |
| C04B 14/06 | (2006.01) | |
| C04B 14/38 | (2006.01) | |
| C04B 16/06 | (2006.01) | |
| C04B 28/04 | (2006.01) | |
| C04B 14/42 | (2006.01) | |
| C04B 14/48 | (2006.01) | |
| C04B 111/34 | (2006.01) | |

(52) U.S. Cl.
CPC .......... *C04B 16/0691* (2013.01); *C04B 14/04* (2013.01); *C04B 14/06* (2013.01); *C04B 14/38* (2013.01); *C04B 14/42* (2013.01); *C04B 14/48* (2013.01); *C04B 16/0625* (2013.01); *C04B 16/0633* (2013.01); *C04B 28/04* (2013.01); *C04B 2111/34* (2013.01); *C04B 2201/50* (2013.01); *Y02W 30/92* (2015.05); *Y02W 30/94* (2015.05)

(58) Field of Classification Search
CPC ..... C04B 16/0691; C04B 14/04; C04B 14/06; C04B 14/38; C04B 14/42; C04B 14/48; C04B 16/0633; C04B 2201/50; C04B 16/0625; C04B 28/04; C04B 2111/34
See application file for complete search history.

(56) References Cited

U.S. PATENT DOCUMENTS

| | | | |
|---|---|---|---|
| 2003/0150364 A1 | 8/2003 | Orange et al. | |
| 2018/0134620 A1* | 5/2018 | Esser | ................ C04B 28/04 |

FOREIGN PATENT DOCUMENTS

| | | |
|---|---|---|
| CN | 102092996 A | 6/2011 |
| CN | 102206068 A | 10/2011 |
| CN | 102976697 A | 3/2013 |
| KR | 100940550 B1 | 2/2010 |
| WO | 2011053103 A2 | 5/2011 |
| WO | 2014094692 A1 | 6/2014 |

OTHER PUBLICATIONS

International Search Report and Written Opinion for International Application No. PCT/EP2016/063312 (11 Pages) (dated Aug. 30, 2016).

* cited by examiner

*Primary Examiner* — Anthony J Green
(74) *Attorney, Agent, or Firm* — Lucas & Mercanti, LLP

(57) ABSTRACT

A concrete mix having sand, fine aggregates, binder, fibers, and various admixtures is provided. The mix has a consistency from S2 to SF3, a compressive strength in the range of 30-80 MPa and a ductility represented by fc, fl1, fR1 and fR3 values, wherein the concrete mix contains at least 390 Kg of binder, the concrete mix has a paste volume of 300-600 liters, the concrete mix contains at least two systems of fibers and a general admixture system that is composed of at least 2 sub-admixture systems.

10 Claims, 1 Drawing Sheet

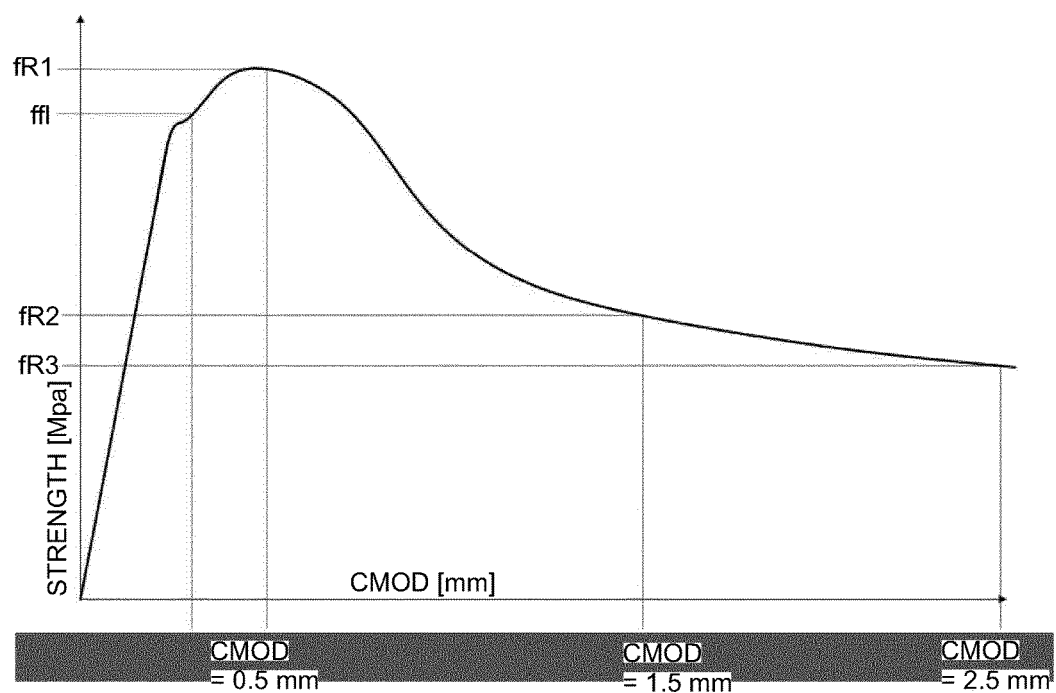

ADVANCED FIBER REINFORCED CONCRETE MIX DESIGNS AND ADMIXTURES SYSTEMS

CROSS REFERENCE TO RELATED APPLICATION

This Application is a 371 of PCT/EP2016/063312 filed on Jun. 10, 2016, which claims priority of International Application No. PCT/EP2015/063045 filed Jun. 11, 2015, both of which are incorporated herein by reference.

FIELD OF THE INVENTION

The present invention relates to concrete formulations for high mechanical performances in structural designs, fiber reinforcement special mix designs to limit or avoid steel rebars or pre-stressing. More specifically, the invention discloses concrete mix designs with high volumetric content of fibers and that the concrete contains different types of fibers to form a so-called hybrid fiber system.

BACKGROUND OF THE INVENTION

Conventional fiber reinforced concrete technology is known, it has been described in various National and International Norms e.g. RILEM 162 TDF International), Model Code 2010 (International), CNR DT 204 (Italy SS 812310 (Sweden), TR63 (UK) ACI 318 (USA) ACI 360 (USA), DBV (Germany), DAFSTB (Austria). Fiber reinforced concrete mix designs containing different types of fibers have been for examples disclosed for example in WO 2011/053103 and more recently in CN102976697 and KR100940550. Such concrete are mainly used for pavement or deck repairs or to minimize the shrinkage of the concrete during hardening.

In WO 2011/053103, the main objective is to provide with a concrete to build large slabs, therefore, one property to be achieved is shrinkage resistance in order to avoid cracks formation. Therefore, shrinkage reducing agents, namely ethylene glycol, free lime or calcium sulfoaluminate, is used in combination with polymer fibers (synthetic fibers) whose role is mainly to reduce cracking due to shrinkage.

According to WO 2011/053103, the workability of the concretes is located in the classes F5 to F6, yet no data are disclosed concerning the workability retention (opening time) of the final concrete produced. Furthermore, no data and results are disclosed concerning the compressive and flexural strength of the concretes according to the invention.

Amongst others, one important disadvantage of the patent application WO 2011/053103 is the requirement to prepare a separate slurry containing water, cement and all shrinkage reducers and plasticizers (or water reducers admixture—namely powdered melamine or phosphonates), or fillers as well as fillers. The slurry is then added to the concrete prepared separately and the fibers are added.

A further important drawback of the invention according to WO 2011/053103 is the fact that the final placed concrete has to be cured using water after placing.

An additional drawback of the invention according to WO 2011/053103 is that the volume of paste is very low to ensure limited shrinkage and avoid cracking, thus reducing the scope of application and placement properties and well as the level of mechanical resistances that can be achieved, both in terms of compressive strength and in terms of flexural strength or ductility. Finally the document does not disclose water/total binder content (kg/kg) others than 0.42 and 0.46, which limits drastically the type of properties that can be achieved.

BRIEF DESCRIPTION OF THE DRAWING

The FIGURE Shows flexural test results showing Crack Mouth Opening (CMOD) versus Strength according to EN 14651 and the values for ffl, fR1, fR3.

DESCRIPTION OF THE INVENTION

Relevant information related to Norms and normative tests mentioned in this patent application is described in Tables 1 and 2.

TABLE 1

Consistency of concrete (slump) with respect to EN (European) and FR (French) Norms and normative tests.

| EN 12350-2 | | NF P 18-305 | |
| --- | --- | --- | --- |
| Consistency | slump [mm] | Consistency | slump [mm] |
| S1 | 10 to 40 | Stiff | 0 to 40 |
| S2 | 40 to 90 | Plastic | 50 to 90 |
| S3 | 100 to 150 | highly plastic | 100 to 150 |
| S4 | 160 to 210 | fluid | >160 |
| S5 | >220 | | |

TABLE 2

Consistency of concrete (flow) with respect to EN 12350-8 (European) Norms EN 206-1

| category | Flow [mm] |
| --- | --- |
| SF1 | 550-650 |
| SF2 | 660-750 |
| SF3 | 760-850 |

The present invention provides a concrete mix comprising sand, fine aggregates, binder, fibers, and various admixtures, having a consistency from S2 to SF3, a compressive strength in the range of 30-80 MPa and a ductility represented by the following values:

30<fc<80 MPa
3<ffl<12 MPa
3<fR1<12 MPa
2.5<fR3<15 MPa wherein the concrete mix contains at least 390 Kg of binder, the concrete mix comprises a paste volume of 300-600 liters, the concrete mix contains at least two systems of fibers A and B, the fibers system A consists of metallic fibers with a dosage of 25-100 kg/m3 with respect to the concrete mix and mechanical resistance (or ultimate strength) of at least 1200 MPa, the fibers system B have a dosage of 0.2%-0-9% by m$^3$ of the concrete mix, the concrete mix contains a general admixture system that is composed of at least 2 subadmixture systems I and II, wherein the first Admixture system I comprises at least 2 polycarboxylic acid co-polymers (PCE), a strong water reducer PCE and a workability retention PCE, wherein the second Admixture system II is a stabilizer obtained from a compound selected from the group consisting of modified cellulose, carboxymethyl cellulose, hydroxyethyl cellulose, hydroxypropyl methyl cellulose, natural starch, modified starch, branched modified starch, naturals gums, Xanthan gum, fine silica, colloidal silica, silica fume and any combination thereof, herewith concrete mix of the invention.

The meaning of fc, ffl, fR1 and fR3 is the following (see FIG. 1):

fc is compressive strength, ffl is flexural strength, fR1 is strength for crack mouth opening 0.5 mm, fR2 is strength at CMOD 1.5 mm and fR3 is Strength at CMOD 2.5 mm.

The concrete mix of the invention is for slabs, floors or structural constructions with high ductility and workability retention.

The present invention proposes a solution to overcome the various drawbacks of WO 2011/053103. The concrete mix designs according to the present invention are not limited to shrinkage resistance enhancement using shrinkage reducers and synthetic fibers for this unique goal and true structural properties to be used in structural engineering for decks, bridges, pillars, etc. Also, the fiber reinforced fresh concrete mix designs according to the invention are engineered to comply with industrial production requirements, they are produced in conventional concrete mixing plants, can be transported over large distance since they have a high workability retention and do not need special curing techniques once placed.

Also, the present invention enables to provide a concrete presenting a real ductility behavior in fracture (or stress hardening) as can be shown in the FIG. 1, from the matrix cracking point, exhibiting smooth post peak reinforcement without abrupt reduction in mechanical resistance. Ideally, the fracture behavior in flexion shall not show any first crack evidence, so the slope of the stress/CMOD curve is always positive.

Another embodiment is the concrete mix of the invention, further comprising coarse aggregates.

Another embodiment is the concrete mix of the invention, wherein the fibers of fibers system A have a length of 35-100 mm.

Another embodiment is the concrete mix of the invention, wherein the fibers system B comprises 65-90% in volume of metallic fibers.

Another embodiment is the concrete mix of the invention, wherein the metallic fibers have a length of 5-35 mm.

Another embodiment is the concrete mix of the invention, wherein the dosing of the Admixture system I is of 0.5-5% weight percent with respect to the binder content and the dosing of the admixture system II is of 0.1-2% weight percent with respect to the binder. This concrete mix is for high ductile thin slabs or floors with a consistency of S2-SF3.

Another embodiment is the concrete mix of the invention, wherein the dosing of the Admixture system I is of 0.1-1% weight percent with respect to the binder content and the dosing of the admixture system II is of 0.1-0.5% weight percent with respect to the binder. This concrete mix is for high ductile this slabs or floors with a consistency of S2-S4.

Another embodiment is the concrete mix of the invention, wherein the concrete mix comprises an admixture system III, wherein the third Admixture system III is obtained from a compound selected from the group consisting of cellulose microfibers, synthetic waxes, natural waxes, superabsorbing polymers, starch crosslinked polymers, acrylate crosslinked polymers, hexylene glycol (2-Methyl-2,4-pentanediol) and any combination thereof and the dosage of the admixture system III is of 0.3-6 weight percent with respect to the binder.

Another embodiment is the concrete mix of the invention, wherein fibers system C, comprising synthetic fibers, is added to the concrete mix.

Another embodiment is the concrete mix of the invention, wherein the dosage of fibers system C is of 0.02% to 2% volume with respect to the concrete.

Another embodiment is the concrete mix of the invention, wherein a part of the sand or the fine aggregates or the coarse aggregates are substituted by lightweight aggregates selected from the group consisting of expanded glass, expanded clay, pumice and expanded shale.

Another embodiment is the concrete mix of the invention, wherein the substitution rate for all aggregates (sand or/and fine or/and coarse aggregates) is at least 30% in volume.

The invention concerns special concrete mix designs to achieve any desired classes of compressive strength, while providing a high ductility and the fresh and hardened stages.

The ductility at hardened stages (28 days) is measured using flexural stress-strain measurement according to Norm EN 14651 (load increase needed to further opening the mouth size of the notch using a CMOD (Crack Mouth Opening Device)).

Table 3 indicates the resistances and ductility values expressed by the strength at various CMOD with respect to norm EN 14651.

TABLE 3

Various requirements for the mechanical resistances in fiber reinforced concrete.

| | Strength requirements | | | |
|---|---|---|---|---|
| Application for fiber reinforced concrete | fc [Mpa] | ffl [Mpa] | fR1 [Mpa] | fR3 [Mpa] |
| Industrial slab-on-grade | 30-60 | 3-8 | 2-10 | 2-10 |
| ICF | 40-100 | 4-10 | 5-13 | 3-25 |
| Structural rehabilitation/seismic design for ancien buildings/strengthtening of old structures | 80-200 | 8-15 | 10-30 | 15-60 |
| Precast industry - bridge segments | 60-200 | 5-15 | 7-35 | 15-50 |
| Precast industry - tunnel lining segments | 30-100 | 3-8 | 2-12 | 2-20 |
| Precast industry - new jersey | 30-50 | 3-5 | 2-8 | 2-8 |
| Precast industry - pipes | 40-80 | 3-7 | 4-10 | 4-10 |
| Precast industry - refractory concrete | 40-100 | 4-9 | 8-30 | 5-15 |
| Columns | 30-200 | 3-10 | 3-10 | 5-40 |

The concrete mix designs according to the invention contain at least 2 Fibers Systems A and Fibers System B that in combination provides the targeted mechanical properties. The Fibers System A contains only metallic fibers as described in Table 4:

TABLE 4

Characteristics of the Fibers System A (high resistance, structural)

| Geometry | Hooked end wire, straight slit sheet or wire, deformed slit sheet or wire, flattened-end slit sheet or wire, machined chip, melt extract |
|---|---|
| E modulus [Gpa] | 150-250 |
| Yielding strength YS [Mpa] | 1000-4000 |
| Ultimate strength [MPa] | 1200-5000 |
| length [mm] | 35-100 |
| length/diameter | 30-120 |
| coating | no coating or zinc |
| density [kg/m3] | 6800-8000 |

The Fibers system A can be prepared with different types of metallic fibers corresponding to the characteristics indicated in Table 4.

The Fibers System B contains high strength fibers that are shorter than the Fibers of Fibers System A. and is described in table 5.

TABLE 5

Characteristics of the Fiber System B for mono or multi-filaments type fibers (high resistance, structural)

|  | Glass | Aramid | Carbon | Basalt | Steel |
|---|---|---|---|---|---|
| E modulus [Gpa] | 40-100 | 40-200 | 100-400 | 50-500 | 150-220 |
| Ultimate strength (US) [MPa] in tension | 900-1800 | 3500-4500 | 1000-7000 | 2000-6000 | 1300-5000 |
| Yield strength YS [MPa] in tension | na | 3000-4000 | na | na | 1200-4000 |
| length [mm] | 5-60 | 5-60 | 0.1-30 | 5-100 | 5-35 |
| length/diameter | 10-300 | 30-150 | 10-1000 | 10-10000 | 30-120 |
| coating | no coating | no coating | no coating | no coating | no coating or zinc |
| density [kg/m3] | 2000-4000 | 1200-1600 | 800-2500 | 1500-4000 | 6800-8000 |

The Fibers System B can be made out of steels fibers, glass fibers, polyaramid, carbon fibers and/or basalt fibers or any combination thereof.

The geometry of the none metallic fiber are normally straight whereas the metallic fibers in system B can be hooked end wire, straight slit sheet or wire, deformed slit sheet or wire, flattened-end slit sheet or wire, machined chip, melt extract, or straight, etc. The metallic fibers can be made of amorphous metal.

The fibers in System A are used to bridge macro-cracks and provide ductility by pull-out whereas the B type fibers have mainly the function to bridge micro cracks and delay the micro-cracks propagation with energy dispersion on pull out and further micro-cracking.

Preferably, the fibers in system A are hooked, with a yield strength above 100000 MPa, preferably above 1200 MPa and even more preferably above 1400 MPa.

The ratio length divided by diameter (mm/mm) is typically located between 40 and 100, preferably between 45 and 95.

Preferably, the steel fibers in system B are hooked or straight with a yield strength above 1200 MPa, preferably above 1300 MPa and even more preferably above 1500 MPa.

The ratio length divided by diameter (mm/mm) is typically located between 50 and 95 preferably between 55 and 90.

Preferably the fibers system B may contain non-metallic fibers like glass fibers, with a minimum ultimate strength of 900 MPa, more preferably over 1300 MPa and even more preferably above 1500 Mpa, and a minimum length of 5 mm. The fiber system B may also contain basalt fibers, preferably with a minimum strength of 2500 MPa and a minimum length of 5 mm. Both glass and basalt fibers used are straight and multifilament In another preferred embodiment, the fiber system B contains at least 2 types of fibers, one of them being high performance steel fibers. Preferably, the content of high performance steel fibers in Fiber system B is located between 65% and 90% in volume, whereas the remaining fibers in Fiber system B can be glass or basalt or any mix thereof.

Alternatively a third synthetic fibers System C can be added to the concrete mix according to the invention, for instance acrylic fibers, polyethylene fibers, polypropylene fibers, polyester fibers to enhance properties like fire resistance or intrinsic shrinkage. Alternatively, cellulose fibers may be used in fibers system C.

TABLE 6

Characteristics of the Fibers system C

|  | Acrylic | Nylon | Polyester | Polyethylene | Polypropylene |
|---|---|---|---|---|---|
| E modulus [Gpa] | 5-30 | 1-10 | 5-40 | 1-15 | 1-15 |
| Ultimate strength (US) [Mpa] | 150-1400 | 100-2000 | 500-1500 | 100-600 | 100-1100 |
| length [mm] | 1-100 | 1-100 | 1-100 | 1-100 | 1-100 |
| length/diameter | 30-150 | 30-150 | 30-150 | 30-150 | 30-150 |
| bundling | loose | loose | loose | loose | loose |
| coating | no coating | no coating | no coating | no coating | no coating |
| density [kg/m3] | 1000-1400 | 1000-1400 | 1200-1500 | 800-1200 | 800-1200 |

The concrete is designed to allow achieving the targeted performances in terms of strength, ductility, elasticity Modulus, placement and rheological properties, workability retention, etc.

The targeted properties are not only achieved by selecting the appropriate fibers mix design. The concrete formulation also plays an important role and is an integral part of the invention. The required ductility and mechanical properties are thus obtained by a combined effect of the concrete matrix and the special design of the hybrid fiber mix design.

Typically, the concrete according to the invention contains the following ingredients per cubic meter of produced concrete (Table 7).

TABLE 7

Ingredients of the concrete matrix without admixture Systems

| | Unit | Value |
|---|---|---|
| Total binder | kg/m3 | 280-1000 |
| Cement (any type) | % mass of total binder | 40-100 |
| Fly ash | % mass of total binder | 0-50 |
| Silica fume | % mass of total binder | 0-40 |
| GGBS | % mass of total binder | 0-40 |
| Other pozzolanic materials | % mass of total binder | 0-40 |
| Fillers (limestone, . . .) | % mass of total binder | 0-40 |
| By pass dust | % mass of total binder | 0-40 |
| Total aggregates + sand | kg/m3 | 1000-2000 |
| Sand - 0/4 mm | % volume of total aggregates | 20-100 |
| Aggregates - 4/8 mm or equivalent | % volume of total aggregates | 0-80 |
| Aggregates >7-8 mm, less than 20 mm | % volume of total aggregates | 0-50 |
| Water/total binder in weight | kg/Kg | 0.1-0.8 |
| Air | % volume of concrete | 0.1-20 |
| Volume of paste | liters | min 250 |
| Volume of fibers System A | % volume of concrete | 0.03 to 4 |
| Volume of fibers System B | | 0.03 to 3 |
| Volume of fibers System C | | 0 to 2 |
| PCE Admixtures systems | dry solid content weight % of the total binder | 0.1 to 5 |
| Internal Curing admixture system | dry solid content weight % of the total binder | 0 to 3 |

The cement is typically CEM I, II and III, the fly ash is a conventional fly ash the sand is round or crushed sand, typically 0-4 mm and the fine or coarse aggregates are either round or crushed.

All ingredients of the final concrete are mixed using conventional industrial concrete mixers. The mixing time is conventional for about 30 seconds to some minutes.

Concrete samples of dimensions 700 mm×150 mm×150 mm were prepared, de-molded at 24 hours and were cured for 28 days at constant temperature 22° C. air humidity (relative humidity 95%) before mechanical testing.

Test Machine was an Universal Testing Machine (UTM) a Zwick Roell Z250 was used to perform the flexure fracture tests According to the invention, the concrete mix has the following values of mechanical properties:
30<fc<80 MPa
3<ffl<12 Mpa
3<fR1<12 Mpa
2.5<fR3<15 MPa
with consistencies from S2 to SF3, the concrete mix of the invention preferably contains a total binder weight that is located between 370 and 800 Kg per m³ of concrete, a water to total binder located between 0.2 and 0.6, more preferably between 0.3 and 0.55, a total volume of paste that is located between 300 and 600 liters, a total weight content of sand+fine aggregates+coarse aggregates of 1000-1900 Kg per m³ of concrete, the quantity of sand represents 30-60% of the total mass of the sand+fine+coarse aggregates.

Preferably, the concrete mix of the invention contains:
Fibers System A from 0.3 to 1.2% volume of concrete
Fibers System B from 0.1 to 1.2% volume of concrete A third optional third Fibers system C can be optionally used, whereas the fibers volume in Fibers system C ranges from 0 to 1.2 volume % of concrete.

More preferably, the concrete mix of the invention has the following characteristics:
30<fc<80 MPa
3.5<ffl<11 Mpa
3.5<fR1<11 Mpa
3.4<fR3<13 MPa
Fibers System A from 0.3 to 1 volume % of concrete 0.3-1
Fibers System B from 0.2 to 0.9 volume % of concrete 0.2-0.9

The concrete mix of the invention optionally comprises:
Fibers System C from 0 to 0.08% volume % of concrete.

Fibers in System B contains either 100% volume metallic fibers or 100% none metallic fibers, or a mix of metallic and none metallic structural fibers. Preferably the non-metallic fibers are glass fibers or basalt fibers or any mix thereof.

According to other embodiment of the invention, the concrete mix of the invention contains Fibers system C, a Fibers system A that is consisting of at least 2 different types of metallic fibers and a fibers system B that contains any mix or combination of high strength fibers metallic, organic, glass based, carbon based or basalt based.

The 3 admixture systems I, II and III used according to the invention are characterized below:

Admixture System I: Superplasticizing

This admixture system is a combination of at least two polycarboxylate ethers, with homo- or co-polymeric backbone, based on acrylic, methacrylic, maleic or allilic constitutional repeating units:

A strong water reducer PCE of molecular weight ranging from 20000 to 100000 g/mol, with grafting density ranging from 10 to 35%, ethereal side chains ranging from 750 to 5000 g/mol, optionally cross-linked with ethereal and alkylic bridges of length up to 14 EO (Ethylene Oxide Unit), PO (Propylene Oxide Units), Carbon unit, optionally containing etheroatomic functions, such as Sulphonate or Phosphonate organic derivatives.

As workability retention PCE, of molecular weight ranging from 20000 to 100000 g/mol, with grafting density ranging from 10 to 60%, ethereal side chains ranging from 750 to 5000 g/mol, optionally cross-linked with ethereal and alkylic bridges of length up to 14 EO, PO, Carbon unit, optionally containing etheroatomic functions, such as Sulphonate or Phosphonate organic derivatives, optionally bearing postphonate groups on acrylic residues, based on linear and branched alcohols, alkyl methoxy, ethoxy, propoxy end-capped linear groups or ethereal chains up to 5000 g/mol.

The dosage of the Admixture System I typically ranges from 0.05-5% solid content based on weight of total binder (total cement+total fly ash or slag+total silica fume) depending on the concrete placement properties targeted.

The ratio in weight (dry solid content) of the strong water reducer PCE and the workability retention PCE is typically located between 20:80 and 60:40 depending of the targeted application.

Admixture System II: Stabilizing

The stabilizer is a solid, a water solution, emulsion or dispersion of compounds such as:

Modified cellulose, such as carboxymethyl cellulose, hydroxyethyl cellulose, hydroxypropyl methyl cellulose.
Natural and modified starch, preferably branched.
Naturals gums such as Xanthan gum.
Fine silica, such as colloidal silica,
or any combination thereof.

The dosage of the admixture system B is typically located between 0.05-2.5% solid content based on weight of binder (total cement+total fly ash or slag+total silica fume), depending on the segregation risk related to the fibers and the workability retention targeted.

Admixture System III: Internal Curing

The internal curing agent: a solid, paste, a water solution, emulsion or dispersion of compounds such as:
- Cellulose microfibers
- Synthetic or natural waxes
- Superabsorbing polymers, such as modified starch or acrylate crosslinked polymers.
- Hexylene glycol (2-Methyl-2,4-pentanediol)

The total dosage of the admixture system I and system II cannot exceed however the value of 5 weight % of the total binder.

The typical dosage of Admixture system III ranges from 0.05 to 6% solid content based on weight of binder depending on the conditions (size, temperature, relative humidity of the air, etc.).

Alternatively, the concrete mix of the invention may have a partial of full substitution of the sand and aggregates with lightweight sand and aggregates (expanded shale, expanded clay, expanded glass or pumice, natural puzzolans, etc.). This enables to obtain lightweight structural fiber reinforced concretes with densities below 1800 kg/m$^3$, preferably below 1600 Kg/m$^3$ or even more preferably below 1400 kg/m$^3$.

The concrete mix of the invention may contain strength development accelerators, to reach 4-6 MPa resistance after a couple of hours. This is important for post treatment of slabs (helicopter finishing for instance) that can be done a couple of hours after the casting of the slab, thus saving time and improving efficiency.

The concrete mix of the invention may also include a retarding agent for instance and sugar modified structures, vinasses, molasses, or chelating agents, etc.

The concrete mix of the invention may use an air entrainer (like surfactants, soaps or hydrophobic compounds) to ensure a trapped volume of air from 2% to 15% in volume of the final concrete for freeze-thaw resistance or fire resistance depending on the application.

The general admixture System, consisting of the 3 Admixture Systems I, II and III not only enables to obtain a controlled workability over various classes (S1 to SF3), it also enables to perfectly disperse the high amount of fibers in the Fibers Systems A and B (and optionally in fibers System C) providing a very good stability of the fibers in the concrete matrix, avoiding segregation of the fibers or bleeding of the none metallic fibers thanks to optimized mixing conditions. This explains why the concrete mix of the invention can be produced using conventional concrete mixing techniques.

There are many advantages associated with the concretes according to the invention as will be seen from the examples below.

The first advantage is that the combination of the concrete mix designs, the fiber mix designs (fibers systems A, B and optionally C) and admixtures systems (I, II and III) enables to overcome all the problems from the prior art and provide a wide range of consistencies, that can by managed and controlled by the 3 admixture systems I, II and II.

Furthermore, the invention provides concrete mixes having high volume of paste that can achieve very high shrinkage reducing and enables to cast very large slabs up to 3000 m$^2$ without the appearance of cracks due to elevated ductility and resistances without having to use synthetic fibers that are weakening the resistance of the matrix and limits the applications. The combined usage of the high strength fibers system B and the admixture systems provides an optimum combination of shrinkage reduction and mechanical performances (compressive strength, flexural strength and ductility).

A further advantage of the invention is that the properties of the concrete paste, as the result of the combination of the paste content and the admixture systems, enable to use short (less than 40 mm) metallic fibers and/or high dosage of metallic fibers (over 70 Kg/m3 of concrete up to 165 kg/m3 of concrete) with no risks of segregation of without impacting the targeted consistency of the final concrete or the workability retention.

The concrete mix of the invention doesn't require special time consuming and costs ineffective curing actions, due to the presence when needed of the admixture system III, enabling self curing.

The concrete mix of the invention applies to wide range of construction elements, like slabs up to 3000 m2 without joints and without shrinkage cracks, floors, seismic applications, Insulated Concrete Frame for vertical walls, bridge segments, precast industry—tunnel lining segments, structural rehabilitation, etc.

The controlled rheology of the concrete mix of the invention enables building flat slabs or slabs with a designed slope.

The concrete mix of the invention has applications in large seamless thin slabs, floors and levels, bridges elements, concrete beams, concrete for impact resistance, seismic applications, etc. The concrete mix of the invention do not require any particular mixing processes or sequences and can be obtained in any dry of wet concrete batching plant.

One further characteristic of the concrete mix of the invention is that it provides consistency up to the SF3 self placing and self leveling consistency classes in a controlled manner through a sophisticated overall system of admixtures, and do not require any specific curing protection (water spraying, surface covering, etc.).

The concrete mix of the invention has high opening times or workability retention (period of time from the initial mixing of the ingredients during which the workability expressed by the consistency classes of the concrete S1-S5 and SF1-SF3 for self placing concretes) of the concrete does change, and remains in the same consistency class. The combination of the concrete mix design, the fibers mix design and the admixture system together enables to achieve the targeted improvements and properties.

Definitions

Hydraulic binder Material with cementing properties that sets and hardens due to hydration even under water. Hydraulic binders produce calcium silicate hydrates also known as CSH.

Cement Binder that sets and hardens and bring materials together. The most common cement is the ordinary Portland cement (OPC) and a series of Portland cements blended with other cementitious materials.

Ordinary Portland cement Hydraulic cement made from grinding clinker with gypsum. Portland cement contains calcium silicate, calcium aluminate and calcium ferroaluminate phases. These mineral phases react with water to produce strength.

Mineral Addition Mineral admixture (including the following powders: silica fume, fly ash, slags) added to concrete to enhance fresh properties, compressive strength development and improve durability.

Silica fume Source of amorphous silicon obtained as a byproduct of the silicon and ferrosilicon alloy production. Also known as microsilica.

Total binder Is the sum of all cementitious components (cement, flay ash, slag, silica fume, etc.)

Volume of paste Is the total volume of the cement, +fly ash+slag+silica fume+water+entrained air Fibers Material used to increase concrete's structural performance. Fibers include: steel fibers, glass fibers, synthetic fibers and natural fibers.

Alumino silicate—by-product (Fly Ash—bottom ash) Alkali reactive binder components that together with the activator form the cementitious paste. These are minerals rich in alumina and silica in both, amorphous and crystalline structure.

Natural Pozzolan Aluminosilicate material of volcanic origin that reacts with calcium hydroxide to produce calcium silicate hydrates or CSH as known in Portland cement hydration.

Inert Filler A material that does alter physical properties of concrete but does not take place in hydration reaction.

Admixture raw material Chemical component in an admixture formulation system of one main chemical polymer.

Admixture Chemical admixtures used to modify or improve concrete's properties in fresh and hardened state. These could be air entrainers, water reducers, set retarders, accelerators, stabilizers, superplasticizers and others.

Air entrained Total volume of air entrained in the concrete by the air entrainer.

PCE PCE are Polycarboxylic Acid Co-Polymers used as a class of cement and concrete admixtures, and are comb type polymers that are based on: a polymer backbone made of acrylic, methacrylic, maleic acid, and related monomers, which is grafted with polyoxyalkylene side-chain such as EO and/or PO. The grafting could be, but is not limited to, ester, ether, amide or imide.

Initial dispersant Initial dispersant is a chemical admixtures used in hydraulic cement compositions such as Portland cement concrete, part of the plasticizer and superplasticizer family, which allow a good dispersion of cement particles during the initial hydration stage.

Superplasticizers Superplasticizer relates to a class of chemical admixture used in hydraulic cement compositions such as Portland cement concrete having the ability to highly reduce the water demand while maintaining a good dispersion of cement particles. In particular, superplasticizers avoid particle aggregation and improve the rheological properties and workability of cement and concrete at the different stage of the hydration reaction.

Concrete Concrete is primarily a combination of hydraulic binder, sand, fine and/or coarse aggregates, water. Admixture can also be added to provide specific properties such as flow, lower water content, acceleration . . . .

Pourable construction materials A material is consider as pourable as soon as its fluidity (with our without vibration) allow to full fill a formwork or to be collocate in a definite surface.

Construction materials Any materials that can be use to build construction element or structure. It includes concrete, masonries (bricks-blocks), stone, ICF . . . .

Structural applications A construction material is consider as structural as soon as the compressive strength of the material is greater than 25 MPa Workability The workability of a material is measure with a slump test (table 1: slump)

Workability retention Is the capability of a mix to maintain its workability during the time. The total time required depends on the application and the transportation.

Internal Curing Admixture Admixture agent that retains water and release the eater internally in a delayed matter to compensated form water depletion due to drying Strength development—setting/hardening The setting time start when the construction material change from plastic to rigid. In the rigid stage the material cannot be poured or moved anymore. After this phase the strength development corresponding to the hardening of the material Coarse Aggregates Manufactured, natural or recycled minerals with a particle size greater than 6 mm and a maximum size lower than 32 mm Fines Aggregates Manufactured, natural or recycled minerals with a particle size typically greater than 3 mm and a maximum size lower than 10 mm Sand aggregates Manufactured, natural or recycled minerals with a particle size lower than 3 or 4 mm Ductility Is the capacity of the concrete to deform in a none elastic way, keeping resistances expressed by residual strength a certain displacement (CMOD) according to norm EN 14651

Yield strength Is the strength measured in traction or tension from which the constitutive law between elongation and applied stress in no longer linear Flexural strength Is the strength measured on 3 points bending tests (notched prismatic samples 500 mm×150 mm×150 mm) according to norm EN 14651

Ultimate strength (US) Ultimate strength of the fibers before rupture w/b Total free water (w) mass in Kg divided by the total binder mass in Kg

EXAMPLES OF THE INVENTION

Various examples of mix designs and corresponding results are presented here according to the invention.

Example 1

| Material | Unit | Quantity |
| --- | --- | --- |
| Total binder content | kg/m3 | 390 |
| CEM II 32.5 N A-LL | kg/m3 | 390 |
| w/b eff | — | 0.4 |
| Admix System I | % total binder content | 0.80% |
| Admix System II | % total binder content | 0.30% |
| Sand ¾ round | kg/m3 | 736 |
| Fine aggregates gravel ⅘ round | kg/m3 | 461 |
| Coarse aggregates gravel 8/16 round | kg/m3 | 646 |
| Fiber type A - l/d = 65-l = 60 mm, US = 1350 Mpa, YS = 1200 Mpa hooked | % volume | 1.00% |
| Fiber type B - steel - l/d = 60-l = 16 mm, US = 2350 Mpa, YS = 2100 MPa straight | % volume | 0.20% |
| Entrained air | l/m3 | 25 |
| Paste volume | l/m3 | 308.87 |

| Results | Unit | Value |
| --- | --- | --- |
| Slump class | — | S3 |
| Slump flow | mm | 145 |
| Workability retention | min | 80 |
| fc | Mpa | 32 |
| ffl | Mpa | 4.1 |
| fr1 | Mpa | 3.6 |
| fr3 | Mpa | 3.9 |
| E modulus | Gpa | 27.9 |

This example with a low paste volume enable to achieve SF2 slump class (or consistency). In this example, only steel fibers are used in Fiber system B.

Example 2

| Material | Unit | Quantity |
|---|---|---|
| Total binder content | kg/m3 | 430 |
| CEM I 42.5 N | kg/m3 | 300 |
| Fly ash | kg/m3 | 130 |
| w/b eff | — | 0.55 |
| Admix System I | % total binder content | 0.10% |
| Admix System II | % total binder content | 0.20% |
| Sand 0/4 round | kg/m3 | 735 |
| Fine aggregates gravel 4/8 round | kg/m3 | 327 |
| Coarse aggregate gravel 8/11 crushed | kg/m3 | 573 |
| Fiber type A - l/d = 50-l = 55 mm, US = 1780 Mpa, YS = 1530 MPa hooked | % volume | 0.35% |
| Fiber type B - glass - l/d = 57-l = 12 mm, US = 1650 Mpa, straight | % volume | 0.20% |
| Entrained air | l/m3 | 20 |
| Paste volume | l/m3 | 385.90 |

| Results | Unit | Value |
|---|---|---|
| Slump class | — | S4 |
| Slump | mm | 165 |
| Workability retention | min | 85 |
| fc | Mpa | 35.2 |
| ffl | Mpa | 3.9 |
| fr1 | Mpa | 3.3 |
| fr3 | Mpa | 3.6 |
| E modulus | Gpa | 27.2 |

This other example uses only metallic fibers in Fiber system B.

Example 3

| Material | Unit | Quantity |
|---|---|---|
| Total binder content | kg/m3 | 510 |
| CEM II 42.5 R/A-P | kg/m3 | 330 |
| Fly ash | kg/m3 | 130 |
| Silica fume | kg/m3 | 50 |
| w/b eff | — | 0.45 |
| Admix System I | % total binder content | 1.30% |
| Admix System II | % total binder content | 1.30% |
| Admix System III | % total binder content | 2.80% |
| Gluconate retarder | % total binder content | 0.20% |
| Sand 0/2 round | kg/m3 | 311 |
| Sand 0/4 crushed | kg/m3 | 543 |
| Fine aggregates gravel 4/7 crushed | kg/m3 | 389 |
| Coarse aggregates gravel 6/12 crushed | kg/m3 | 311 |
| Fiber type A - l/d = 80-l = 44 mm, US = 2540 Mpa, YS = 2350 MPa, hooked | % volume | 0.35% |
| Fiber type A - l/d = 90-l = 50 mm, US = 3020 Mpa, YS = 2860 Mpa, hooked | % volume | 0.25% |
| Fiber type B - steel - l/d = 60-l = 6 mm, US = 2130 Mpa, YS = 1810 MPa, straight | % volume | 0.20% |
| Entrained air | l/m3 | 12 |
| Paste volume | l/m3 | 423.16 |
| Slump class | — | SF3 |
| Slump flow | mm | 810 |
| Workability retention | min | 120 |

| Results | Unit | Value |
|---|---|---|
| fc | Mpa | 57.9 |
| ffl | Mpa | 6.8 |
| fr1 | Mpa | 8 |
| fr3 | Mpa | 7.8 |
| E modulus | Gpa | 30.7 |

This example shows an alternative according to the inventions with 2 different types of metallic fibers used in fibers system A and only steel fibers in Fibers system B.

Example 4

| Material | Unit | Quantity |
|---|---|---|
| Total binder content | kg/m3 | 520 |
| CEM III/A 42.5 N | kg/m3 | 400 |
| Limestone Filler | kg/m3 | 120 |
| w/b eff | — | 0.4 |
| Admix System I | % total binder content | 0.80% |
| Admix System II | % total binder content | 0.48% |
| Admix System III | % total binder content | 5.10% |
| Sand 0/4 round | kg/m3 | 1021 |
| Fine aggregates gravel 4/9 Crushed | kg/m3 | 682 |
| Fiber type A - l/d = 50-l = 50 mm, US = 1250 Mpa, YS = 1080 MPa, straight | % volume | 0.35% |
| Fiber type B - Basalt - l/d = 1100-l = 12 mm, US = 3500 Mpa, straight | % volume | 0.35% |
| Entrained air | l/m3 | 34 |
| Paste volume | l/m3 | 417.59 |

| Results | Unit | Value |
|---|---|---|
| Slump class | — | S4 |
| Slump | mm | 175 |
| Workability retention | min | 60 |
| fc | Mpa | 51.2 |
| ffl | Mpa | 5.7 |
| fr1 | Mpa | 5.1 |
| fr3 | Mpa | 4.7 |
| E modulus | Gpa | 34.9 |

This example uses only mineral fibers (basalt) in the Fibers system B.

Example 5

| Material | Unit | Quantity |
|---|---|---|
| Total binder content | kg/m3 | 650 |
| CEM I 42.5 R | kg/m3 | 400 |
| Silica fume | kg/m3 | 70 |
| GGBS | kg/m3 | 180 |
| w/b eff | — | 0.38 |
| Admix System I | % total binder content | 3.70% |
| Admix System II | % total binder content | 1.80% |
| Admix System III | % total binder content | 0.70% |
| Sand 0/1 round | kg/m3 | 308 |
| Sand 0/4 crushed | kg/m3 | 228 |
| Fine aggregates gravel 2/6 round | kg/m3 | 403 |
| Coarse aggregates gravel 4/13 round | kg/m3 | 403 |
| Fiber type A - l/d = 92-l = 60 mm, US = 2470 Mpa, YS = 2250 MPa, hooked | % volume | 0.70% |
| Fiber type B - Steel - l/d = 60-l = 30 mm, US = 2850 Mpa, YS = 2650 hooked | % volume | 0.25% |

-continued

| | Unit | Value |
|---|---|---|
| Fiber type B - Aramid - l/d = 100-l = 18 mm, US = 4500 Mpa, straight | % volume | 0.10% |
| Entrained air | l/m3 | 17 |
| Paste volume | l/m3 | 484.66 |

| Results | Unit | Value |
|---|---|---|
| Slump class | — | SF1 |
| Slump | mm | 600 |
| Workability retention | min | 120 |
| fc | Mpa | 78 |
| ffl | Mpa | 11.4 |
| fr1 | Mpa | 11.6 |
| fr3 | Mpa | 14.3 |
| E modulus | Gpa | 41.2 |

Example of very high ductility concrete, with 2 types of high strength fibers in Fibers system B (steel and aramid).

Example 6

| Material | Unit | Quantity |
|---|---|---|
| Total binder content | kg/m3 | 500 |
| CEM II/A-T 42.5 N | kg/m3 | 300 |
| Fly ash | kg/m3 | 200 |
| w/b eff | — | 0.49 |
| Admix System I | % total binder content | 0.90% |
| Admix System II | % total binder content | 0.20% |
| Admix System III | % total binder content | 2.50% |
| Accelerator - calcium formate | % total binder content | 2.00% |
| Sand ¼ round | kg/m3 | 703 |
| fine and coarse Gravel 4/12 round | | 861 |
| Fiber type A - l/d = 50-l = 50 mm, US = 1220 Mpa, YS = 1070 MPa, hooked | % volume | 0.50% |
| Fiber type B - Steel - l/d = 80-l = 30 mm, US = 3020 Mpa, YS 2810 = MPa hooked | % volume | 0.25% |
| Fiber type B - Glass - l/d = 80-l = 30 mm, US = 3020 Mpa, | % volume | 0.10% |
| Entrained air | l/m3 | 24 |
| Paste volume | l/m3 | 447.57143 |

| Results | Unit | Value |
|---|---|---|
| Slump class | — | S5 |
| Slump flow | mm | 220 |
| Workability retention | min | 45 |
| fc | Mpa | 46 |
| ffl | Mpa | 4.9 |
| fr1 | Mpa | 5.4 |
| fr3 | Mpa | 5.7 |
| E modulus | Gpa | 28.5 |

Example according to the invention where the Fibers system B contains both metallic and glass high strength fibers and a strength accelerator using calcium formiate in the admixtures system.

Example 7

| Material | Unit | Quantity |
|---|---|---|
| Total binder content | kg/m3 | 430 |
| CEM II 32.5 B-LL | kg/m3 | 280 |
| Fly ash | kg/m3 | 150 |
| w/b eff | — | 0.58 |
| Admix System I | % total binder content | 1.70% |
| Admix System II | % total binder content | 0.60% |

-continued

| | Unit | |
|---|---|---|
| Sand ⅔ round | kg/m3 | 725 |
| Fine aggregates gravel 3/10 round | kg/m3 | 403 |
| Coarse aggregates gravel 10/20 round | kg/m3 | 484 |
| Fiber type A - l/d = 65-l = 55 mm, US = 1570 Mpa, YS = 1380 MPa, hooked | % volume | 0.30% |
| Fiber type B - Steel - l/d = 55-l = 18 mm, US = 2360 Mpa, YS = 2130 MPa, straight | % volume | 0.20% |
| Fiber type C - Polypropylene - l/d = 80-l = 50 mm, US = 750 Mpa, straight | % volume | 0.28% |
| Entrained air | l/m3 | 26 |
| Paste volume | l/m3 | 431.23 |

| Results | Unit | Value |
|---|---|---|
| Slump class | — | SF2 |
| Slump | mm | 710 |
| Workability retention | min | 90 |
| fc | Mpa | 34.9 |
| ffl | Mpa | 3.5 |
| fr1 | Mpa | 3.1 |
| fr3 | Mpa | 4.7 |
| E modulus | Gpa | 25.7 |

This mix design according to the invention includes the Fiber system C with synthetic low resistance fibers (Polypropylene) specifically designed for fire resistance applications.

Example 8

| Material | Unit | Quantity |
|---|---|---|
| Total binder content | kg/m3 | 390 |
| CEM II 32.5 N A-LL | kg/m3 | 390 |
| w/b eff | — | 0.4 |
| Admix System I | % total binder content | 0.80% |
| Admix System II | % total binder content | 0.30% |
| Sand ¼ round | kg/m3 | 736 |
| Gravel 4/8 round | kg/m3 | 461 |
| Gravel 4/16 round | kg/m3 | 646 |
| Fiber type A - l/d = 85-l = 50 mm, YS = 670 MPa, US = 755 Mpa, straight | % volume | 0.50% |
| Fiber type B - Steel - l/d = 60-l = 20 mm, YS = 2740 Mpa, US = 3020 Mpa, hooked | % volume | 0.25% |
| Fiber type B - Glass - l/d = 57-l = 12 mm, US = 2750 Mpa, straight | % volume | 0.05% |
| Entrained air | l/m3 | 32 |
| Paste volume | l/m3 | 311.81 |
| Slump class | — | S3 |
| Slump | mm | 120 |
| Workability retention | min | 80 |
| fc | Mpa | 31.2 |
| ffl | Mpa | 3.5 |
| fr1 | Mpa | 2.1 |
| fr3 | Mpa | 1.4 |
| E modulus | Gpa | 26.7 |

This example shows that the ductility and mechanical resistance requirements are not achieved since the fibers in fibers system A have a resistance (YS and US) that are not matching the invention.

Example 9

| Material | Unit | Quantity |
| --- | --- | --- |
| Total binder content | kg/m3 | 390 |
| CEM II 32.5 N A-LL | kg/m3 | 390 |
| w/b eff | — | 0.4 |
| Admix System I | % total binder content | 0.80% |
| Admix System II | % total binder content | 0.30% |
| Sand ¼ round | kg/m3 | 736 |
| Gravel ⅜ round | kg/m3 | 461 |
| Gravel 4/16 round | kg/m3 | 646 |
| Fiber type A - l/d = 85-1 = 50 mm, YS = 1680 Mpa, US = 1845 Mpa, hooked | % volume | 0.40% |
| Entrained air | l/m3 | 32 |
| Paste volume | l/m3 | 311.81 |
| Slump class | — | S4 |
| Slump | mm | 170 |
| Workability retention | min | 80 |
| fc | Mpa | 31.2 |
| ffl | Mpa | 3.8 |
| fr1 | Mpa | 1.4 |
| fr3 | Mpa | 0.8 |
| E modulus | Gpa | 27.3 |

Example 9 shows that a typical concrete mix design containing only fibers system A (although with high resistance) that is a reference on the market. Example evidences the need for fibers system B to achieve the level of ductility according to the invention.

It is clear that the invention is not limited to the provided examples and that the selection of the various ingredients depend on the final application, placing and mechanical targeted properties and cost of the mix design.

The invention claimed is:

1. A concrete mix comprising sand, aggregates, binder, fibers, and various admixtures,
    having a consistency from concrete-slump class S2 to slump-flow class SF3, based on European Standard concrete slump test,
    a compressive strength in the range of 30-80 MPa and
    a ductility represented by the following values:
        30<compressive strength (fc)<80 MPa
        3<flexural strength (ffl)<12 MPa
        3<strength for Crack Mouth Opening Device (CMOD) at 0.5 mm (fR1)<12 MPa
        2.5<strength for CMOD at 2.5 (fR3)<15 MPa,
    wherein
    the concrete mix contains at least 390 Kg of binder per m³ of the concrete mix,
    the concrete mix comprises a paste volume of 300-600 liters,
    the concrete mix contains at least two systems of fibers A and B,
    wherein the fibers system A comprises metallic fibers with a dosage of 25-100 kg/m3 with respect to the concrete mix and mechanical resistance of at least 1200 MPa,
    wherein the fibers system B comprises mono- or multifilament fibers and have a dosage of 0.2%-0-9% by volume of the concrete mix,
    the concrete mix contains a general admixture system that is composed of at least 2 sub-admixture systems I and II,
    wherein the sub-admixture system I comprises at least 2 polycarboxylic acid co-polymers (PCE) selected from the group consisting of a water reducer PCE and a workability retention PCE,
    wherein the sub-admixture system II is a stabilizer selected from the group consisting of modified cellulose, carboxymethyl cellulose, hydroxyethyl cellulose, hydroxypropyl methyl cellulose, natural starch, modified starch, branched modified starch, naturals gums, Xanthan gum, silica, colloidal silica, silica fume and any combination thereof.

2. Concrete mix according to claim 1, further comprising coarse aggregates.

3. Concrete mix according to claim 1, wherein the fibers of fibers system A have a length of 35-100 mm.

4. Concrete mix according to claim 1 wherein the fibers system B comprises 65-90% in volume of metallic fibers.

5. Concrete mix according to claim 4, wherein the metallic fibers have a length of 5-35 mm.

6. Concrete mix according to claim 1 wherein a dosing of the sub-admixture system I is of 0.5-5% weight percent with respect to the binder content and the dosing of the sub-admixture system II is of 0.1-2% weight percent with respect to the binder.

7. Concrete mix according to claim 1 wherein a dosing of the sub-admixture system I is of 0.1-1% weight percent with respect to the binder content and the dosing of the sub-admixture system II is of 0.1-0.5% weight percent with respect to the binder.

8. Concrete mix according to claim 1 wherein the concrete mix comprises a sub-admixture system III, wherein the sub-admixture system III is selected from the group consisting of cellulose microfibers, synthetic waxes, natural waxes, superabsorbing polymers, starch crosslinked polymers, acrylate crosslinked polymers, hexylene glycol (2-Methyl-2,4-pentanediol) and any combination thereof and the dosage of the sub-admixture system III is of 0.3-6% weight percent with respect to the binder.

9. Concrete mix according to claim 1 wherein fibers system C, comprising synthetic fibers, is added to the concrete mix.

10. Concrete mix according to claim 9, wherein a dosage of fibers system C is of 0.02% to 2% volume with respect to the concrete.

* * * * *